Dec. 10, 1929.     C. B. FOWLER     1,739,451

WHISTLE CUP

Filed March 5, 1929

WITNESSES

INVENTOR
Clarence B. Fowler
BY
ATTORNEY

Patented Dec. 10, 1929

1,739,451

UNITED STATES PATENT OFFICE

CLARENCE B. FOWLER, OF NEW YORK, N. Y.

WHISTLE CUP

Application filed March 5, 1929. Serial No. 344,542.

This invention relates to cups, and particularly to an improved cup for use by small children, the object being to provide a cup structure involving a whistle or other noise-maker capable of being operated only when the cup is empty.

Another object of the invention is to provide a special cup structure which is so formed as to induce a small child to drink the milk or other contents of the cup in order to operate certain of the parts which are especially pleasing to the child.

Another object of the invention is to provide a special cup structure so formed as to provide a choice of two methods of drinking the liquid contained therein; firstly, drinking from the rim in the ordinary manner; secondly, removing the contents by suction through a tube.

A further object of the invention is to provide a cup and whistle structure in which all surfaces which can come in contact with liquid contents may be readily and completely exposed, to facilitate cleansing and sterilization.

In the accompanying drawing,—

Figure 1:
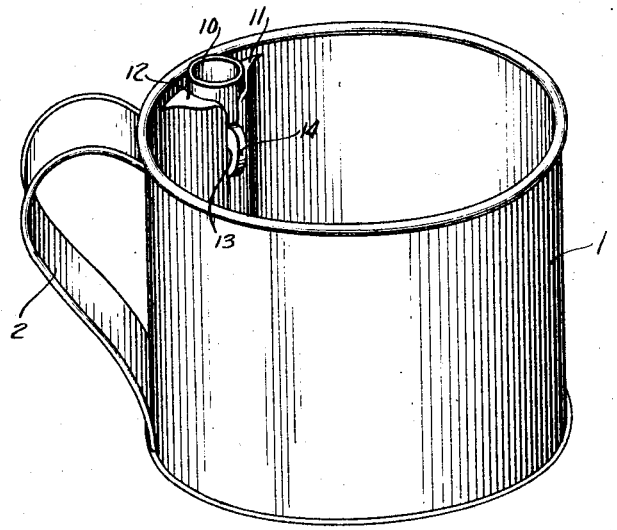
Figure 1 is a perspective view of a cup disclosing an embodiment of the invention.
Figure 2:
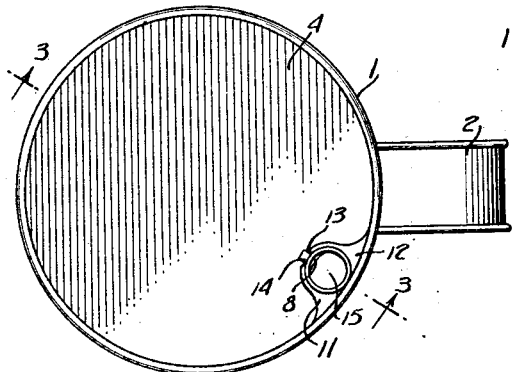
Figure 2 is a top plan view of the cup shown in Figure 1, the same being on a slightly reduced scale.
Figure 3:
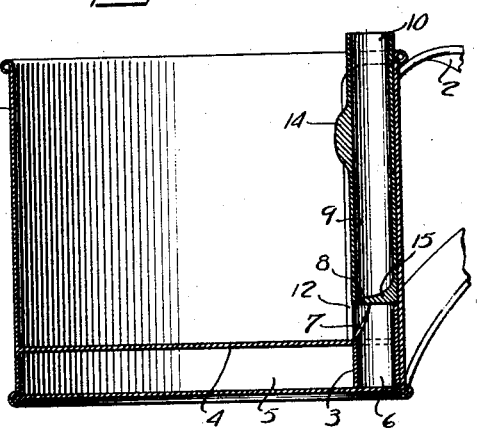
Figure 3 is a sectional view through Figure 2 on the line 3—3.
Figure 4:
Figure 4 is a detail perspective view of the whistling tube removed, certain parts being broken away.

Referring to the accompanying drawings by numerals, 1 indicates the body of the cup or container, and 2 a handle. An ordinary tin cup has been shown in the drawing, but it will be evident that the device may be made from glass or other material and made in many different shapes. Located within the container or body 1 is a tube 3 and a false bottom 4. The false bottom is soldered or otherwise rigidly secured to the side walls of body 1 and to the tube 3 so that none of the milk or other contents of the cup can enter the space 5 but may freely enter the space 6 in the bottom of tube 3. Instead of forming a false bottom 4 the tube 3 could project into the bottom of the container and be provided with a closed end, but this would ordinarily be objectionable as the bottom of the cup could not be as readily cleansed. The tube 3 has an arc-shaped whistle edge 7 coacting with the opening or slot 8 of the sliding tube 9, whereby when anyone blows into the end 10 of tube 9 air will pass out the slot 8 and strike edge 7, whereby a whistling sound will be produced, provided the space 6 is empty. The tube 3 projects into a pair of semi-tubular members 11 and 12 which are soldered or otherwise connected to the body 1 and formed with an opening or slot 13 therebetween. This opening or slot accommodates the projection 14 carried by the tube 9, whereby the tube when inserted into the members 11 and 12 will always be properly positioned for the slot 8 to coact with the edge 7. The parts are preferably proportioned so that the bottom end of tube 9 rests on the top end of tube 3, while the end 10 preferably projects a slight distance above the top end of body 1. A small partition member 15 is carried by tube 9 and coacts with part of the tube for forming slot 8, which slot is of any desired shape which will direct the air against edge 7 to cause a whistling sound. Tube 9 is readily removable and is designed to be removable when cleaning the cup or when it is desired to prevent the child from using the whistle. In feeding children it is customary to include a cup or glass of milk as part of the meal. Many times small children will drink very little or none of the milk and it is difficult for the parent to compel the child to drink the desired amount. The present invention is intended to overcome this difficulty in providing the whistle for the child which will function only after all the milk has been drunk. After all the milk has been drunk including the milk entering the chamber or space 6 the child may blow down the tube 9 and produce a whistling sound which will naturally be in proportion to the volume of air used. As a reward for drinking the milk the child may be allowed to whistle a few times, but whenever it is thought necessary to stop the whistling the parent may merely remove tube 9 and the device will not function any more.

A whistle structure of a conventional tubular pattern is shown and described but this feature may also be made in an arc-shaped or a multitubular form and the air vibrating means may be so designed as to simulate a horn or flute, without departing from the spirit of the invention.

What I claim is:—

1. A cup including a body having a false bottom, a tube extending through said false bottom, said tube having a whistling edge and a coacting tube associated with the first-mentioned tube formed with a slot for directing air against said whistling edge for producing a whistling sound when air is forced through the last-mentioned tube.

2. A whistle cup, comprising a cup body having a bottom, a false bottom in said body spaced from the first-mentioned bottom whistle structure including a suction tube extending through said false bottom, whereby the whistle structure is prevented from being operated until the cup has been substantially emptied, and means for mounting said tube in a cup.

3. In a whistle cup a cup body, a pair of arc-shaped guides, a whistle tube projecting into the bottom of said arc-shaped guides, and an air tube removably carried by said arc-shaped guides positioned to direct air against said whistle tube for producing a whistling sound.

4. In a whistle cup a whistle structure including a whistle tube, a pair of guides having a slot therebetween and an air tube formed with projections fitting between said guides and with a restricted nozzle for directing air against said whistle tube, said air tube being bodily removable.

5. A drinking vessel, comprising a sound-producing structure, means for mounting the same in a drinking vessel, and means for preventing the sound-producing structure from being operated until the drinking vessel has been practically emptied.

6. A drinking vessel formed with a body and a hollow holder, a whistle tube so positioned in said holder as to extend to near the bottom of the body, whereby substantially all of the liquid in the body may be removed through said tube by suction, and a vibratory member in said tube positioned to emit a whistling sound when said vessel is substantially empty and said tube is blown into.

Signed at New York in the county of New York and State of New York this 2nd day of March, A. D. 1929.

CLARENCE B. FOWLER.